(12) United States Patent
Adinarayan et al.

(10) Patent No.: US 11,769,098 B2
(45) Date of Patent: Sep. 26, 2023

(54) ANOMALY DETECTION OF PHYSICAL ASSETS BY AUTO-CREATING ANOMALY DETECTION OR PREDICTION MODELS BASED ON DATA FROM A KNOWLEDGE GRAPH OF AN ENTERPRISE

(71) Applicant: International Business Machines Corporation, Armonk, NY (US)

(72) Inventors: Geetha Adinarayan, Bangalore (IN); Joern Ploennigs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 17/323,501

(22) Filed: May 18, 2021

(65) Prior Publication Data

US 2022/0374800 A1 Nov. 24, 2022

(51) Int. Cl.
G06Q 10/0639 (2023.01)
G06N 5/02 (2023.01)
G06Q 10/0635 (2023.01)

(52) U.S. Cl.
CPC .......... G06Q 10/0639 (2013.01); G06N 5/02 (2013.01); G06Q 10/0635 (2013.01)

(58) Field of Classification Search
CPC ... G06N 5/02; G06Q 10/0635; G06Q 10/0639
See application file for complete search history.

(56) References Cited

U.S. PATENT DOCUMENTS 10,579,932 B1    3/2020  Cantrell
10,956,253 B2    3/2021  Della Corte et al.
11,272,011 B1 *  3/2022  Laughton ............... G05B 15/02
2018/0096261 A1  4/2018  Chu et al.
2019/0311810 A1* 10/2019 Sevenster ............. G16H 50/70
2020/0073932 A1  3/2020  Jia et al.
2020/0210854 A1  7/2020  Srinivasan et al.
(Continued)

FOREIGN PATENT DOCUMENTS

CN    105608232 A    1/2019
CN    110704634 A    1/2020
WO    2019137033 A1  7/2019

OTHER PUBLICATIONS

Ruchir Puri, YouTube Video,"Engineering the Future of AI for Enterprises", https://www.youtube.com/watch?v=IPkH9dtT1y8, Apr. 12, 2019, hub.berlin, 4 pages.
(Continued)

*Primary Examiner* — Deirdre D Hatcher
(74) *Attorney, Agent, or Firm* — Edell, Shapiro & Finnan, LLC

(57) ABSTRACT

Data from a knowledge graph associated with an enterprise may be obtained. The knowledge graph may include a plurality of node descriptors that indicate locations, assets, and sensor data feeds of the enterprise, and a plurality of relationship descriptors that indicate relationships amongst the locations, the assets, and the sensor data feeds of the enterprise. An anomaly detection or prediction model associated with a selected one of the plurality of node descriptors may be auto-created based on the data from the knowledge graph. In the auto-creation, one of a plurality of model types for the anomaly detection or prediction model may be selected based on an identified node type of the selected node descriptor.

16 Claims, 7 Drawing Sheets

(56) References Cited

U.S. PATENT DOCUMENTS

| | | | |
|---|---|---|---|
| 2020/0364561 A1 | 11/2020 | Ananthanarayanan et al. | |
| 2020/0371857 A1 | 11/2020 | Guha et al. | |
| 2020/0408566 A1 | 12/2020 | Kang et al. | |
| 2021/0028975 A1* | 1/2021 | Mortensen | G06N 3/08 |
| 2021/0037031 A1 | 2/2021 | Kulkarni et al. | |
| 2021/0037037 A1 | 2/2021 | Oliner et al. | |
| 2021/0097052 A1 | 4/2021 | Hans et al. | |

OTHER PUBLICATIONS

Carlos Ferreira, YouTube Video, "Introducing IBM Maximo Asset Monitor", https://www.youtube.com/watch?v=lyQgRwAseLU, Nov. 7, 2019, 5 pages.

Video, "IBM Operations Analytics Predictive Insights 1.3.6", https://www.ibm.com/docs/en/oapi/1.3.6?topic=developer-predictive-insights-documentation, downloaded from the internet on May 11, 2021, 2 pages.

Horea Porutiu, YouTube Video, "IBM Watson AutoAI machine learning tutorial | Data exploration and visualization", https://www.youtube.com/watch?v=knxbJgPmD5E&t=0s, May 27, 2020, 6 pages.

Mats Gothe, PhD, et al., "Maximo Asset Monitor 101", Hands-on Lab, 77 pages.

"IBM Operations Analytics Predictive Insights 1.3.5", Configuration and Administration Guide, 150 pages.

Video, "IBM Operations Analytics—Predictive Insights Cognitive Overview", https://mediacenter.ibm.com/media/IBM+Operations+Analytics+-+Predictive+Insights+Cognitive+Overview/0_o8kd46x5, 3 pages.

Syed Yousaf Shah, et al., "AutoAI-TS: AutoAI for Time Series Forecasting", arXiv:2012:12347v2 [cs.LG], Mar. 8, 2021, Conference'17, Jul. 2017, Washington, DC, USA, 13 pages.

"AutoAI tutorial: Build a binary classification model—IBM Cloud Pak for Data", https://dataplatform.cloud.ibm.com/docs/content/wsj/analyze-data/autoai_example_binary_classifier.html, Jan. 4, 2021, 7 pages.

Video, "AutoAI tutorial: Build a binary classification model", https://dataplatform.cloud.ibm.com/docs/content/wsj/analyze-data/autoai_example_binary_classifier.html, Jan. 4, 2021, 5 pages.

Nicole Eickhoff, "Why You Don't Need a Data Scientist: Automatically Selecting the Right Anomaly Detection Model", ScienceLogic, https://sciencelogic_com/blog/why-you-dont-need-a-data-scientist-sciencelogic, Apr. 23, 2020, 8 pages.

* cited by examiner

ANOMALY DETECTION OF PHYSICAL ASSETS BY AUTO-CREATING ANOMALY DETECTION OR PREDICTION MODELS BASED ON DATA FROM A KNOWLEDGE GRAPH OF AN ENTERPRISE

BACKGROUND

1. Technical Field

Present invention embodiments relate to anomaly detection of physical assets, and more specifically, to anomaly detection of physical assets by auto-creation of anomaly detection or prediction models based on data from a knowledge graph of an enterprise.

2. Discussion of the Related Art

An enterprise may have a plurality of assets distributed throughout different floors of one or more buildings at its enterprise campus locations. The assets may include machines, such as chillers or air handling units (AHUs). For each asset, there may be one or more sensors that provide time-series data. Multiple sensors of a chiller, for example, may provide pressure data, inlet water temperature, outlet water temperature, and energy usage data.

Efficient management and maintenance of these assets distributed throughout the enterprise may be challenging. A data scientist may build anomaly detection and prediction models for the assets to assist in such management and maintenance. These models may be built based on individual or multiple variables by leveraging domain skills of the data scientist. For example, energy anomaly models may leverage weather data, energy usage data, and calendar data as model features. Scaling this to all of the asset classes for all assets may be difficult and inefficient as it requires the skills of the data scientist to build each model.

SUMMARY

According to one embodiment of the present invention, a method for auto-creating anomaly detection or prediction models based on data from a knowledge graph of an enterprise is described. Data from a knowledge graph associated with an enterprise may be obtained. The knowledge graph may include a plurality of node descriptors that indicate locations, assets, and sensor data feeds of the enterprise, and a plurality of relationship descriptors that indicate relationships amongst the locations, the assets, and the sensor data feeds of the enterprise. An anomaly detection or prediction model associated with a selected one of the plurality of node descriptors may be auto-created based on the data from the knowledge graph. In the auto-creation, one of a plurality of model types of the anomaly detection or prediction model may be selected based on an identified node type of the selected node descriptor. Embodiments of the present invention further include a computer system and a computer program product for auto-creating anomaly detection or prediction models based on data from a knowledge graph in substantially the same manner as described above.

BRIEF DESCRIPTION OF THE DRAWINGS

Generally, like reference numerals in the various figures are utilized to designate like components.

DETAILED DESCRIPTION

Figure 1:
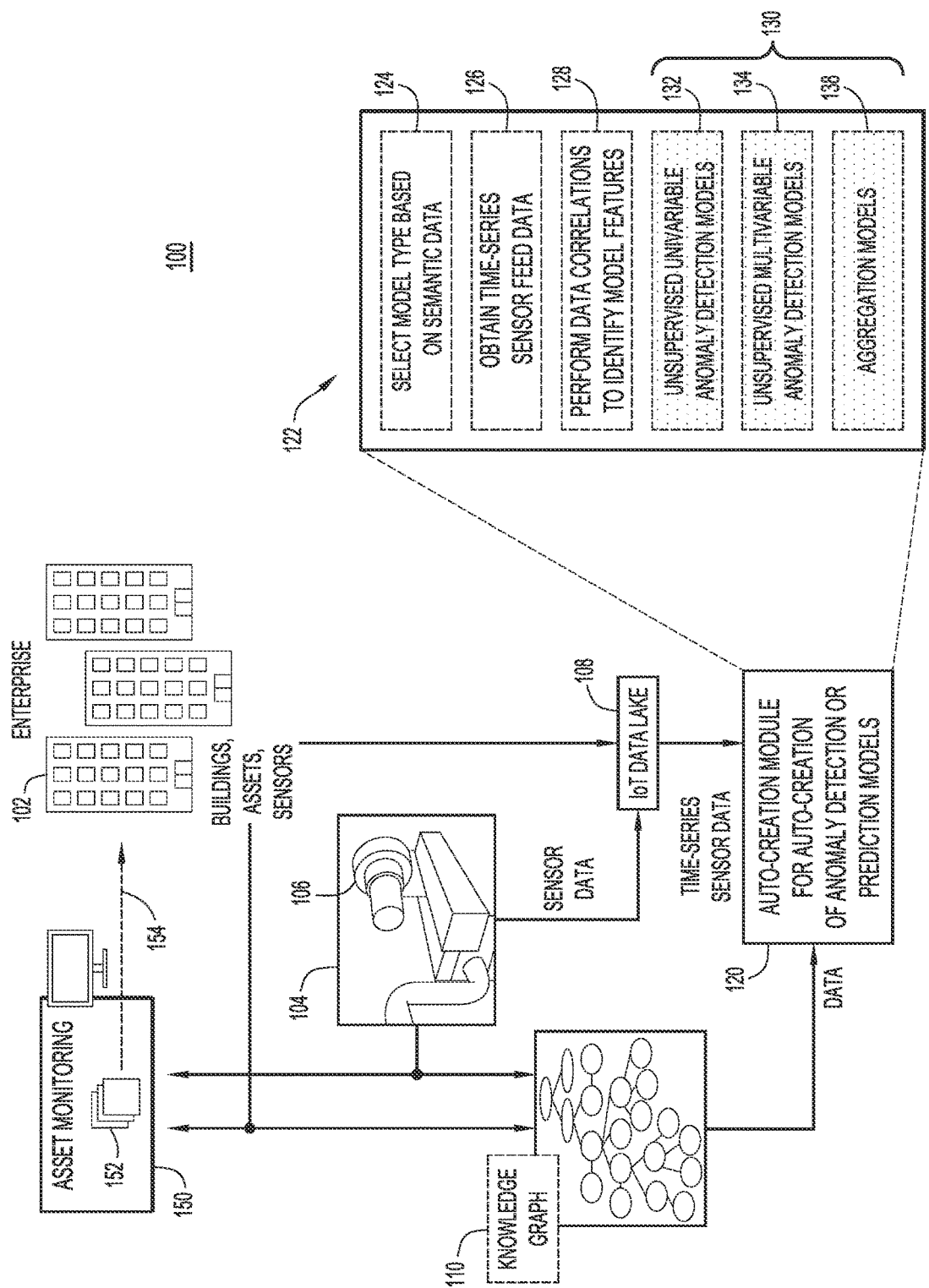
FIG. 1 is an illustrative representation of a system including an auto-creation module for use in the auto-creation of anomaly detection or prediction models based on data from a knowledge graph of an enterprise according to some embodiments of the present disclosure.

FIG. 1 is an illustrative representation of a system 100 including an auto-creation module 120 for use in the auto-creation of anomaly detection or prediction models based on data from a knowledge graph 110 of an enterprise according to some embodiments of the present disclosure. System 100 of FIG. 1 may be associated with an enterprise that has a number of different assets (e.g., an asset 104) distributed throughout different floors of one or more buildings 102 at one or more enterprise campus locations. The assets may include various machines, such as chillers or air handling units (AHUs). For each one of these many assets, there may be a plurality of Internet of Things (IoT) devices or sensors (e.g. one or more sensors 106) which provide time-series data that are communicated and stored in a data store or a central repository, such as an IoT data lake 108. For example, asset 104 may be a chiller which may output time-series data comprised of pressure data, inlet water temperature data, outlet water temperature data, and energy usage data, which is stored in IoT data lake 108. In some scenarios, the enterprise may have a large number of locations (e.g. 50-100 buildings) and a large number of assets (e.g. 500 chillers).

A data lake may be considered to be a centralized repository that provides storage of structured and/or unstructured data. In some embodiments, data from one or more sensors 106 may be obtained periodically from an operational data store (e.g. located either on-premises or at the edge) for one or more sensors 106, converted into a predetermined format that is suitable for queries, and stored in IoT data lake 108.

In general, a knowledge graph represents a collection of interlinked descriptions of entities/objects, events, or concepts. Knowledge graphs are constructed to provide data in context or relation to a specific environment via linking and semantic metadata. In this way, knowledge graphs often provide a helpful framework for data integration, unification, analytics, and/or sharing. In the relevant environment of FIG. 1, knowledge graph 110 may be built or constructed according to the locations, the assets, and the sensor data feeds in the enterprise context. More specifically, knowledge graph 110 may include a plurality of node descriptors of nodes (or "vertices") that indicate the locations, the assets, and the sensor data feeds of the enterprise, and a plurality of relationship descriptors of relationships (or "edges") amongst the various locations, assets, and sensor data feeds of the enterprise.

Auto-creation module 120 may receive data from knowledge graph 110 of the enterprise and time-series sensor data from IoT data lake 108. Based on these data, auto-creation module 120 may auto-create an anomaly detection or prediction model for each one of the plurality of node descriptors of nodes that indicate the various locations, assets, and sensor data feeds. At least some of the anomaly detection or prediction models may include a set of feature variables that are generated or selected based on time-series sensor data associated with one or more sensor data feeds. Model instances of the different anomaly detection or prediction models may be created and deployed for anomaly detection or prediction in relation to the locations, assets, and sensor data feeds. In some embodiments, the models may be optimized over time with use of machine learning (ML) algorithms.

In some embodiments, an asset monitoring tool 150 of the enterprise may utilize one or more (auto-created) model instances 152 for anomaly detection or prediction in relation to the locations, assets, and sensor data feeds of the enterprise. In some preferred embodiments, asset monitoring tool 150 may utilize model instances 152 associated with all locations, assets, and sensor data feeds of the enterprise, or at least many or all assets and sensor data feeds of some or all of its locations.

Asset monitoring tool 150 and/or each one of the model instances 152 may provide an output 154 to indicate anomaly detection or prediction in relation to the locations, assets, or sensor data feeds of the enterprise. In general, anomaly detection may involve detection of a level that is outside of one or more lower or upper threshold levels; here, output 154 of asset monitoring tool 150 may indicate the detection of such a level. In some embodiments, output 154 may be provided in the form of a visual presentation at a visual display for human observance (e.g. detected anomalies associated with user-selectable locations, assets, and/or sensor data feeds). In other embodiments, output 154 may signal a visual alert indicator at a visual display or an audible alert at an audio device for alert in response to a detected anomaly. In yet other embodiments, output 154 may provide a control signal to trigger an alert or an alarm at an identified location or asset having a detected anomaly. In even other embodiments, output 154 may provide a control signal to control a shut-down or power-down of an asset having a detected anomaly. In further embodiments, output 154 may provide a control signal to regulate temperature or energy usage at a location (e.g. floor or building) associated with a detected anomaly.

In some embodiments, auto-creation module 120 may be utilized in system 100 that includes asset monitoring tool 150 for asset and operations management of the enterprise, providing a closed-loop model from capturing and analyzing data to enabling prescriptive maintenance actions. In some embodiments, auto-creation module 120 may be utilized in system 100 that includes asset monitoring tool 150 as part of an IoT platform for an end-to-end, fully-managed cloud service, integrating a bundled set of preselected services to form a public, multi-tenant Software as a Service (SaaS) on a cloud framework.

In some embodiments, auto-creation module 120 may include a plurality of modules or submodules 122 for auto-creating the anomaly detection or prediction models. In FIG. 1, auto-creation module 120 is shown to include a submodule 124 to select one of a plurality of model types based on semantic data of knowledge graph 110. In some embodiments, submodule 124 may be associated with a plurality of model types 130 for auto-creation, including unsupervised univariable anomaly detection models 132, unsupervised multivariable anomaly detection models 134, and/or aggregation models 138. Auto-creation module 120 may also include a submodule 126 to obtain time-series sensor feed data from the relevant sensors and a submodule 128 to perform data correlations to identify model features or variables based on the time-series sensor feed data from these sensors. In some embodiments, auto-creation module 120 and/or its plurality of submodules 122 may be configured to function as described in relation to the figures that follow below.

Figure 2:
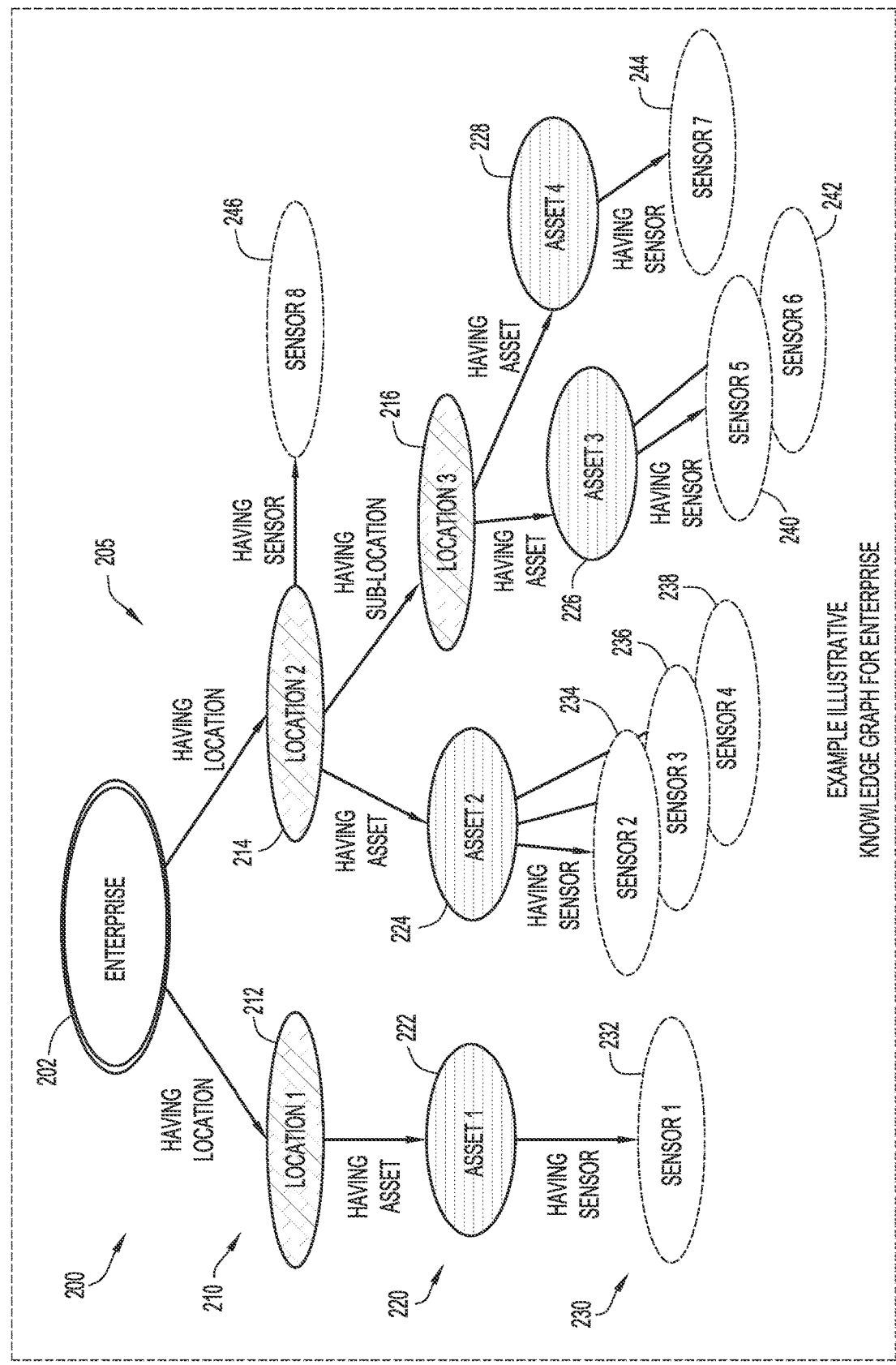
FIG. 2 is an illustrative representation of an example of a knowledge graph associated with an enterprise according to some embodiments, where the knowledge graph includes a plurality of node descriptors of nodes (or "vertices") indicating locations, assets, and sensor data feeds of the enterprise, and a plurality of relationship descriptors of relationships (or "edges") amongst the various locations, assets or sensor data feeds of the enterprise.

FIG. 2 is an illustrative representation of an example of knowledge graph 110 associated with an enterprise 202 according to some embodiments. In some embodiments, knowledge graph 110 of FIG. 2 may be utilized in a technique for auto-creation of anomaly detection or prediction models for an enterprise as described herein.

Knowledge graph 110 of FIG. 2 includes a plurality of node descriptors 200 of nodes (or "vertices") and a plurality of relationship descriptors 205 of relationships (or "edges") amongst the nodes or node descriptors. The plurality of node descriptors 200 may indicate locations, assets, and sensor data feeds of enterprise 202. Accordingly, the plurality of relationship descriptors 205 indicate relationships amongst the various locations, assets, and sensor data feeds of enterprise 202.

More particularly in FIG. 2, the plurality of node descriptors 200 include a plurality of node descriptors 210 that indicate locations, a plurality of node descriptors 220 that indicate assets, and a plurality of node descriptors 230 that indicate (e.g. time-series) sensor data feeds. Specifically, the plurality of node descriptors 210 that indicate locations are node descriptors 212, 214, and 216 (i.e., LOCATION 1, LOCATION 2, and LOCATION 3, respectively), the plurality of node descriptors 220 that indicate assets are node descriptors 222, 224, 226, and 228 (i.e., ASSET 1, ASSET 2, ASSET 3, and ASSET 4, respectively), and the plurality of node descriptors 230 that indicate sensor data feeds are node descriptors 232, 234, 236, 238, 240, 242, 244, and 246 (i.e., SENSOR 1, SENSOR 2, SENSOR 3, SENSOR 4, SENSOR 5, SENSOR 6, SENSOR 7, and SENSOR 8).

As illustrative examples, the plurality of node descriptors 210 that indicate locations (i.e., node descriptors 212, 214, and 216) may indicate campus locations, building locations, and floor locations of the enterprise. The plurality of node descriptors 220 that indicate assets (i.e., node descriptors 222, 224, 226, and 228) may indicate machines including AHUs and chillers of the enterprise. The plurality of node descriptors 230 that indicate sensor data feeds (i.e., node descriptors 232, 234, 236, 238, 240, 242, 244, and 246) may indicate temperature data feeds of temperatures sensors, pressure data feeds of pressure sensors, energy usage data feeds of energy usage sensors, weather data feeds, and calendar data feeds (e.g. day of the week, day of the year, day of the month, and so on).

As the plurality of node descriptors 200 indicate various locations, assets, and sensor data feeds of enterprise 202, the plurality of relationship descriptors 205 represent the relationships amongst the locations, the assets, and the sensor data feeds of enterprise 202. More specifically in FIG. 2, enterprise 202 is indicated as "having location(s)" which correspond to node descriptors 212 and 214 (i.e., LOCATION 1 and LOCATION 2, respectively). Node descriptor 212 (i.e., LOCATION 1) is indicated as "having asset" which corresponds to node descriptor 222 (i.e., ASSET 1), which is indicated as "having sensor" which corresponds to node descriptor 232 (i.e., SENSOR 1). Node descriptor 214 (i.e., LOCATION 2) is indicated as "having asset" which corresponds to node descriptor 224 (i.e., ASSET 2), as "having sub-location" which corresponds to node descriptor 216 (i.e., LOCATION 3), and as "having sensor" which corresponds to node descriptor 246 (i.e., SENSOR 8). Node descriptor 224 (i.e., ASSET 2) is indicated as "having sensor(s) which corresponds to node descriptors 234, 236, and 238 (i.e., SENSOR 1, SENSOR 2, and SENSOR 3, respectively). Node descriptor 216 (i.e., LOCATION 3) is indicated as "having asset" which corresponds to node descriptor 226 (i.e., ASSET 3) and "having asset" which corresponds to node descriptor 228 (i.e., ASSET 4). Node descriptor 226 (i.e., ASSET 3) is indicated as "having sensor(s)" which corresponds to node descriptors 240 and 242 (i.e., SENSOR 5 and SENSOR 6, respectively) and node descriptor 228 (i.e., ASSET 4) is indicated as "having sensor" which corresponds to node descriptor 244 (i.e., SENSOR 7).

According to the present disclosure, techniques and mechanisms for auto-creating anomaly detection models based on data from a knowledge graph of an enterprise, such as knowledge graph 110 of FIG. 2, are described. In one embodiment, a technique may involve selecting one of the plurality of node descriptors 200 in knowledge graph 110 (e.g., node descriptor 224 associated with ASSET 2) and auto-creating an anomaly detection or prediction model associated with the selected node descriptor based on the data in knowledge graph 110. Here, the auto-creation may include selecting one of a plurality of model types for the anomaly detection or prediction model to be created. In some embodiments, an anomaly detection or prediction model may be auto-created with use of one of a plurality of model types that include an unsupervised univariable anomaly detection model type, an unsupervised multivariable anomaly detection model type, and an aggregation model type. In addition, the auto-creation may include selecting or generating one or more model features for the anomaly detection or prediction model based on time-series sensor data of one or more sensor data feeds associated with the selected node descriptor.

The auto-creation may be repeated for each one of the plurality of node descriptors 200 in the knowledge graph, by traversing the data or the node descriptors 200 of the nodes or "vertices" in knowledge graph 110. Accordingly, such a repeated procedure will produce a plurality of anomaly detection or prediction models for the enterprise 202, and these models will be respectively associated with the locations, the assets, and the sensor data feeds of the enterprise.

Model instances of the plurality of anomaly detection of prediction models for anomaly detection or prediction may be created and deployed for asset monitoring (e.g. asset monitoring tool 150 of FIG. 1) in relation to the locations, the assets, and the sensor data feeds respectively associated with the plurality of node descriptors 200.

Figure 3:
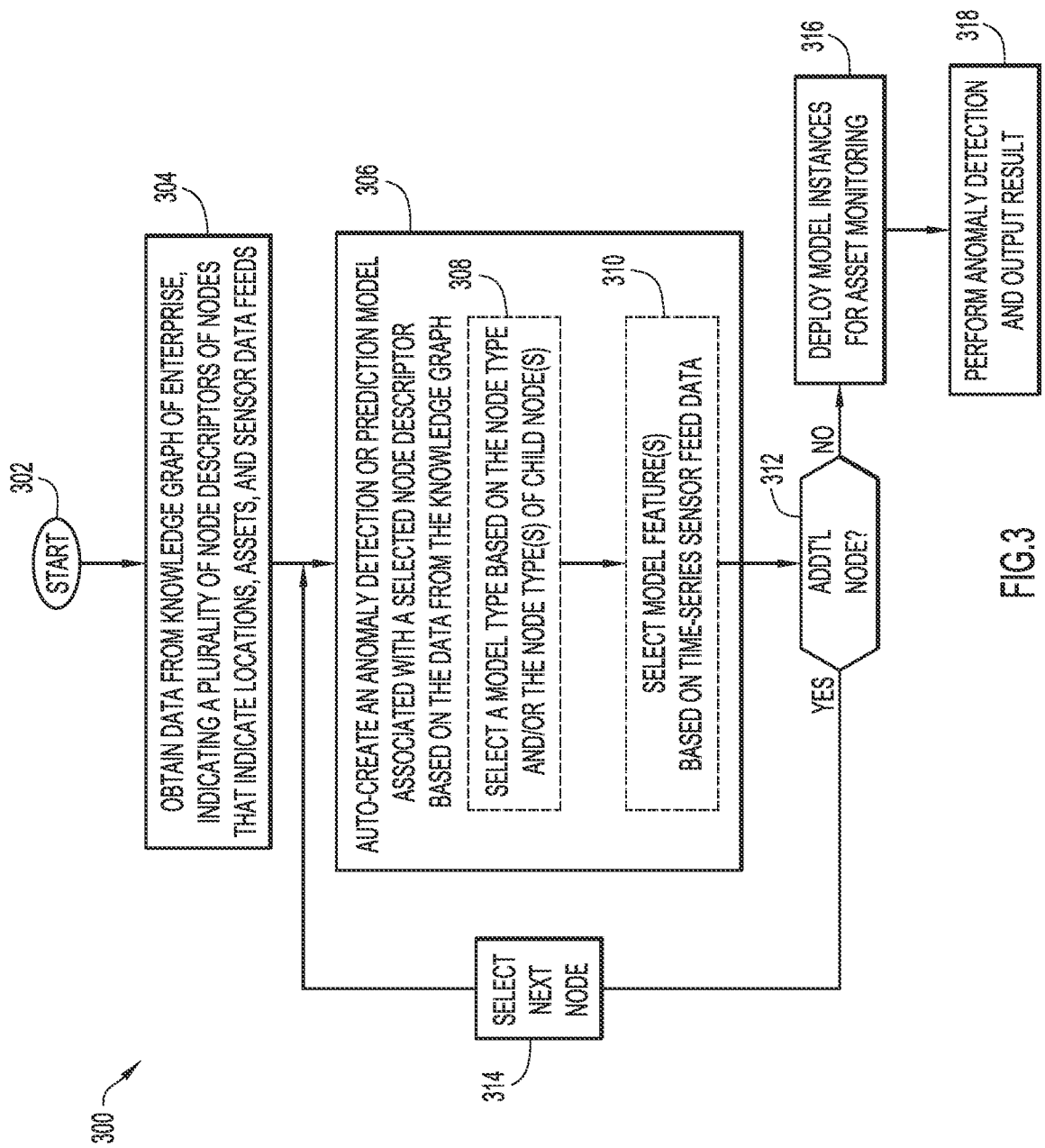
FIG. 3 is a flowchart for describing a method for use in auto-creating anomaly detection or prediction models based on data from a knowledge graph of an enterprise according to some embodiments.

With reference now to FIG. 3, a flowchart 300 for describing a method for use in auto-creating anomaly detection models based on data from a knowledge graph of an enterprise according to some embodiments of the present disclosure is shown. In some embodiments, the knowledge graph for the enterprise may be constructed in advance of the method. The method may be performed by a computer system, and, in at least in some embodiments, a computer system including one or more processing units and memory (e.g., the computer system of FIG. 7 described later below). The method may be embodied in a computer program product which includes a computer readable storage medium and computer readable program instructions stored in the computer readable storage medium, where the computer readable program instructions are executable by one or more processing units of the computer system.

Beginning at a start block 302 of FIG. 3, the computer system may obtain data from a knowledge graph associated with an enterprise (step 304 of FIG. 3). The knowledge graph may include a plurality of node descriptors of nodes (or "vertices") that indicate locations, assets, and sensor data feeds of the enterprise. The knowledge graph may also include a plurality of relationship descriptors of relationships (or "edges") that indicate relationships amongst the locations, the assets, and the sensor data feeds of the enterprise.

The computer system may select one of the plurality of node descriptors of the knowledge graph and auto-create an anomaly detection or prediction model associated with the selected node descriptor based on the data (step 306 of FIG. 3). In step 306, the auto-creation may include selecting one of a plurality of model types for the anomaly detection or prediction model based on an identified node type of the selected node descriptor (step 308 of FIG. 3). The selecting of the model type for the anomaly detection or prediction model may be further based on one or more identified node types of one or more child node descriptors associated with the selected node descriptor (also step 308 of FIG. 3). Further in step 306, the auto-creation may include selecting or generating one or more model feature variables for the anomaly detection or prediction model based on time-series sensor data of one or more sensor data feeds associated with the selected node descriptor (step 310 of FIG. 3).

The computer system may repeat the auto-creating in step 306 for each one of the plurality of node descriptors in the knowledge graph, by testing if there is any next (remaining) node descriptor in the knowledge graph ("YES" in step 312 of FIG. 3) and, if so, selecting the next node descriptor in the knowledge graph for processing (step 314 of FIG. 3). The repeating may be performed by traversing the data (e.g., the node descriptors of the nodes or "vertices") in the knowledge graph. The repeated procedure will produce a plurality of anomaly detection or prediction models respectively associated with the plurality of node descriptors that represent the locations, the assets, and the sensor data feeds of the enterprise. The repeated procedure may be completed when there is no next (remaining) node descriptor in the knowledge graph ("NO" in step 312 of FIG. 3).

Model instances of the plurality of anomaly detection of prediction models may be created and deployed for real-time anomaly detection or prediction in asset monitoring for the enterprise (step 316 of FIG. 3) (e.g. e.g. in asset monitoring tool 150 of FIG. 1). In some embodiments, the models may be optimized over time with use of ML. Anomaly detection may involve detection of a level that is outside of one or more lower or upper threshold levels. As model instances may be deployed in respective association with the locations, the assets, and the sensor data feeds of the enterprise, the asset monitoring or each model instance may provide an output to indicate anomaly detection or prediction in relation to the locations, assets, or sensor data feeds (step 318 of FIG. 3).

In some embodiments, the output may be provided in the form of a visual presentation at a visual display for human observance (e.g. detected anomalies associated with user-selectable locations, assets, and/or sensor data feeds). In other embodiments, the output may signal a visual alert indicator at a visual display or an audible alert at an audio device for alert in response to a detected anomaly. In yet other embodiments, the output may provide a control signal to trigger an alert or an alarm at an identified location or asset having a detected anomaly. In even other embodiments, the output may provide a control signal to control a shut-down or power-down of an asset having a detected anomaly. In further embodiments, the output may provide a control signal to regulate temperature or energy usage at a location (e.g. floor or building) associated with a detected anomaly. As is apparent, automated or semi-automated control over machine assets of the enterprise may be better facilitated.

In some embodiments of FIG. 3, the anomaly detection model may be auto-created with use of one of a plurality of model types that include an unsupervised univariable anomaly detection model type, an unsupervised multivariable anomaly detection model type, and an aggregation model type. In addition, in some embodiments, the different node types of node descriptors for use in selection for the auto-creation of the auto-created anomaly detection model may include a leaf node type and a non-leaf node type. In some embodiments, the different model types utilized for the auto-creation are selected according to the different node types as described in relation to the method of FIG. 4.

In some embodiments, the procedure in FIG. 3 may be re-executed in response to a change in the knowledge graph. For one, a new anomaly detection or prediction model may be auto-created in response to an addition of a new location, a new asset, or a new sensor data feed that is indicated by a newly-added node descriptor in the knowledge graph. Also, an existing anomaly detection or prediction model may be auto-deleted or auto-modified in response to a removal of an existing location, an existing asset, or existing sensor data feed that is indicated by a newly-removed node descriptor.

Figure 4:
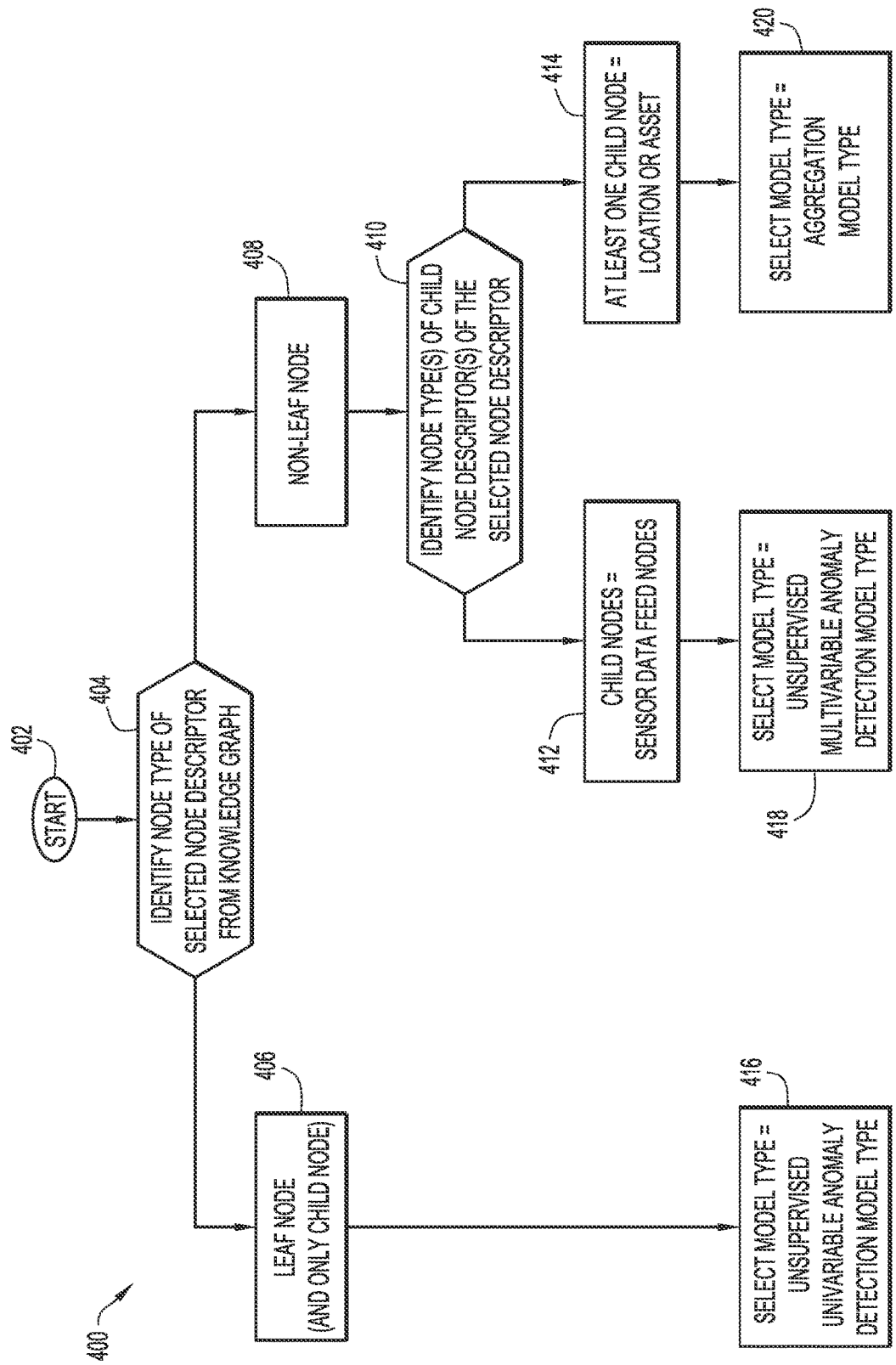
FIG. 4 is a flowchart for describing a method for use in auto-creating anomaly detection or prediction models based on data from a knowledge graph of an enterprise according to some embodiments, which may be utilized together with the method of FIG. 3.

FIG. 4 is a flowchart 400 for describing a method for use in auto-creating anomaly detection or prediction models based on data from a knowledge graph of an enterprise according to some embodiments, which may be utilized together with the method of FIG. 3. More specifically, the method of FIG. 4 relates to the selecting of a model type for auto-creation of the anomaly detection or prediction model based on one or more identified node types associated with the selected node descriptor (e.g., in step 308 of FIG. 3). The method of FIG. 3 may be performed by the computer system, and, in at least in some embodiments, the computer system including one or more processing units and memory (e.g., the computer system of FIG. 7 described later below). The method may be embodied in a computer program product which includes a computer readable storage medium and computer readable program instructions stored in the computer readable storage medium, where the computer readable program instructions are executable by one or more processing units of the computer system.

Beginning at a start block 402 of FIG. 4, the computer system may identify a node type of a selected node descriptor from a plurality of different node types (step 404 of FIG. 4). In some embodiments, the plurality of different node types may include at least a leaf node type and a non-leaf node type. In particular, the computer system may identify that the node type of the selected node descriptor is a leaf node type, or a leaf node type that is also an only child node (step 406 of FIG. 4). Based on identifying in step 406 that the node type is the leaf node type, or the leaf node type that is only an only child node, the computer system may select the model type for auto-creation of the anomaly detection model as an unsupervised univariable anomaly detection model (step 416 of FIG. 4). The computer system may auto-create the anomaly detection model based on the selected model type of step 416, and based on one or more model feature variables identified from time-series data of the sensor data feed associated with the selected node descriptor. In some embodiments, the model auto-creation may employ an ensemble method with use of a set of models, where the model that provides (the most) accurate results for a given dataset is selected.

On the other hand, the computer system may identify that the node type of the selected node descriptor is a non-leaf node type (step 408 of FIG. 4). With respect to this selected node descriptor, the computer system may further identify one or more node types of one or more child node descriptors of one or more child nodes associated with the selected node descriptor (step 410 of FIG. 4). In particular, the computer system may further identify that the selected node descriptor has relationships with child node descriptors that are (e.g., all) sensor feed types (step 412 of FIG. 4). Based on the identifying in step 412, the computer system may select the model type for auto-creation as an unsupervised multivariable anomaly detection model type (step 418 of FIG. 4). The computer system may auto-create the anomaly detection model based on the selected model type in step 418, and based on one or more model feature variables identified from time-series data of the sensor data feeds associated with the selected node descriptor. For example, instead of using all of the variables available from the sensor data feeds, data correlations may be performed for identifying or selecting a reduced or minimal set of model features. In some embodiments, model auto-creation may employ an ensemble method with use of a set of models, where the model that provides (the most) accurate results for a given dataset is selected.

Alternatively in step 410, the computer system may further identify that the selected node descriptor has a relationship with at the least one child node descriptor that represents a location or an asset of the enterprise (e.g., one that is not a sensor data feed) (step 414 of FIG. 4). Based on the identifying in step 414, the computer system may select the model type for auto-creation as a simple aggregation model type (step 420 of FIG. 4). Here, various time-series data may be processed in the aggregate, by providing a sum or total value (e.g., a total energy usage value based on multiple energy usage levels) or an average or mean value (e.g., an average or mean temperature value based on multiple temperature values over time).

After auto-creation of the model, a model instance of the anomaly detection or prediction model may be deployed for anomaly detection or prediction in relation to the location(s), the asset(s), and/or the sensor data feed(s) respectively associated with the node descriptor. An output of the model instance may be plugged into the knowledge graph for access from components (e.g. a user interface).

Thus, as described in relation to FIG. 4, auto-creating an anomaly detection model may include selecting an unsupervised univariable anomaly detection model type as the selected model type based on identifying the identified node type of the selected node descriptor as a leaf node type or a leaf node type that is an only child node. In some embodiments, auto-creating an anomaly detection model may include selecting an unsupervised multivariable anomaly detection model type as the selected model type based on identifying the identified node type as a non-leaf node type. Here, in some further embodiments, auto-creating an anomaly detection model may include selecting the unsupervised multivariable anomaly detection model type as the selected model type based on identifying the identified node type as a non-leaf node type and identifying the selected node descriptor to have relationships with child node descriptors which are (e.g., all) sensor feed types. Here also, in some embodiments, auto-creating the anomaly detection or prediction model may include selecting a minimal or reduced set of feature variables for the anomaly detection or prediction model of the unsupervised multivariable anomaly detection model type based on identifying data correlations on time-series sensor data on the (multiple) sensor data feeds associated with the selected node descriptor.

Figure 5:
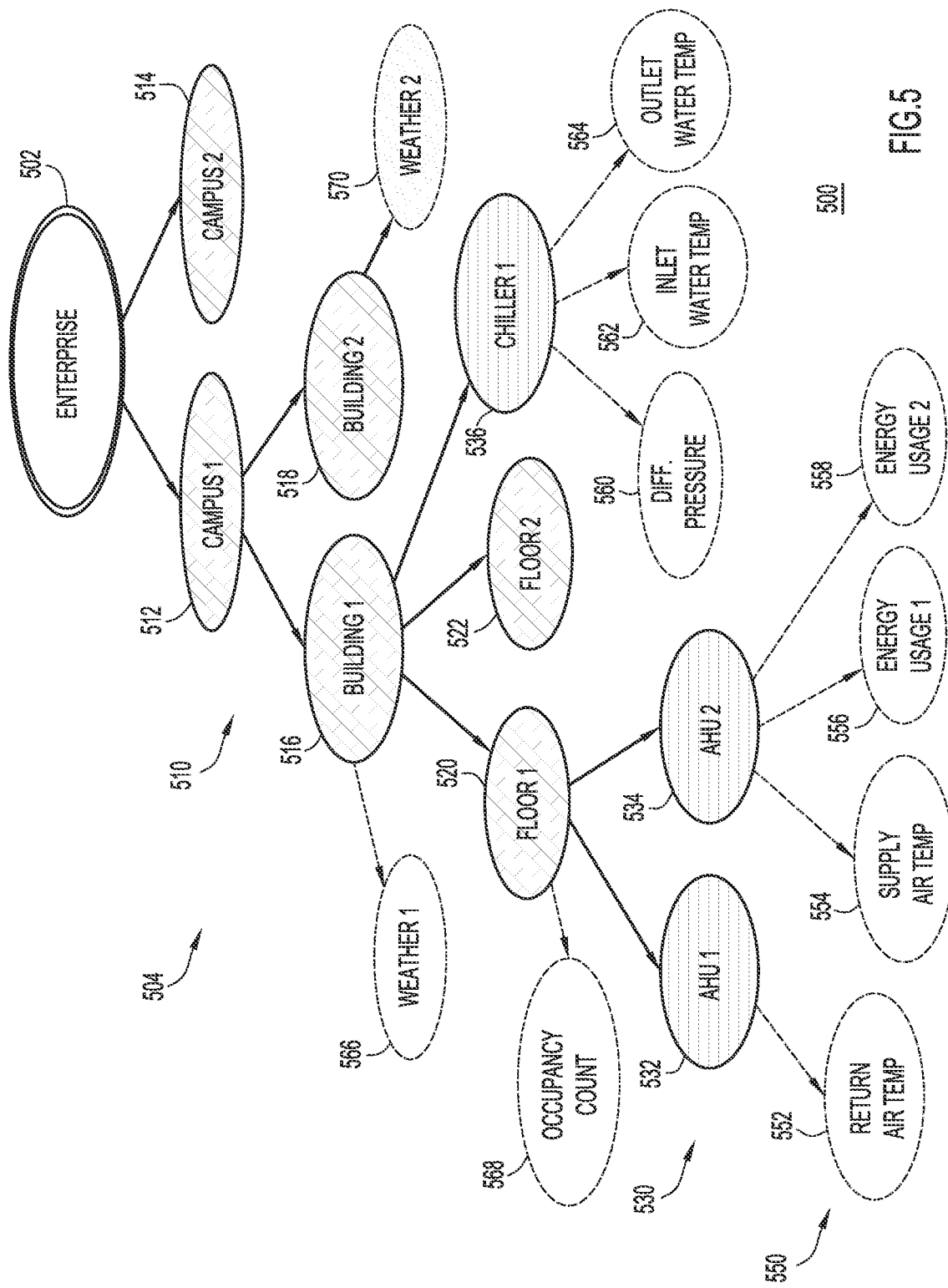
FIG. 5 is an illustrative representation of an example of a knowledge graph associated with an enterprise according to some embodiments, where the knowledge graph includes a plurality of node descriptors of nodes (or "vertices") of specifically-named locations, assets, and sensor data feeds of the enterprise.

FIG. 5 is an illustrative representation of an example of a knowledge graph 500 associated with an enterprise 502 according to some embodiments. As illustrated, knowledge graph 500 of enterprise 502 includes a plurality of node descriptors 504 of nodes (or "vertices") of specifically-named locations, assets, and sensor data feeds of the enterprise 502 to be described below. Knowledge graph 500 also includes a plurality of (implied) relationship descriptors of relationships (or "edges") that indicate the relationships amongst the various locations, assets, and sensor data feeds of enterprise 502.

More particularly in FIG. 5, the plurality of node descriptors 504 include a plurality of node descriptors 510 that indicate locations of enterprise 502, a plurality of node descriptors 530 that indicate assets of enterprise 502, and a plurality of node descriptors 550 that indicate sensor data feeds of enterprise 502. Specifically, the plurality of node descriptors 510 that indicate locations of enterprise 502 are node descriptors 512, 514, 516, 518, 520, and 522 (i.e., CAMPUS 1, CAMPUS 2, BUILDING 1, BUILDING 2, FLOOR 1, and FLOOR 2, respectively). The plurality of node descriptors 530 that indicate assets of enterprise 502 are node descriptors 532, 534, and 536 (i.e., AHU 1, AHU 2, and CHILLER 1, respectively). The plurality of node descriptors 550 that indicate sensor data feeds are node descriptors 552, 554, 556, 558, 560, 562, 564, 566, 568, and 570 (i.e., RETURN AIR TEMP, SUPPLY AIR TEMP, ENERGY USAGE 1, ENERGY USAGE 2, DIFF PRESSURE, INLET WATER TEMP, OUTLET WATER TEMP, WEATHER 1, OCCUPANCY COUNT, and WEATHER 2).

The plurality of (implied) relationship descriptors of knowledge graph 500 may generally be the same as or similar to the relationship descriptors of the knowledge graph described previously in relation to FIG. 2 (i.e., relationship descriptors 205 in knowledge graph 110 of FIG. 2). Specifically, the relationship descriptors of knowledge graph 500 may indicate "having location," "having asset," or "having sensor" as in FIG. 2. To illustrate specific examples in FIG. 5, the node descriptor for enterprise 502 may be associated with relationship descriptors of "having location(s)" which correspond to node descriptors 512 and 514 (i.e., CAMPUS 1 and CAMPUS 2, respectively). Node descriptor 512 for CAMPUS 1 may be associated with relationship descriptors of "having location(s)" which corresponding to node descriptors 516 and 518 (i.e., BUILDING 1 and BUILDING 2, respectively). Node descriptor 516 for BUILDING 1 may be associated with relationship descriptors of "having location(s)" which correspond to node descriptors 520 and 522 (i.e., FLOOR 1 and FLOOR 2, respectively), a relationship descriptor of "having sensor" which corresponds to node descriptor 566 (i.e., WEATHER 1), and a relationship descriptor of "having asset" which corresponds to node descriptor 536 (i.e., CHILLER 1). Node descriptor 536 for CHILLER 1 may be associated with relationship descriptors which correspond to node descriptors 560, 562, and 564 (i.e., DIFF PRESSURE, INLET WATER TEMP, and OUTLET WATER TEMP, respectively).

Figure 6:
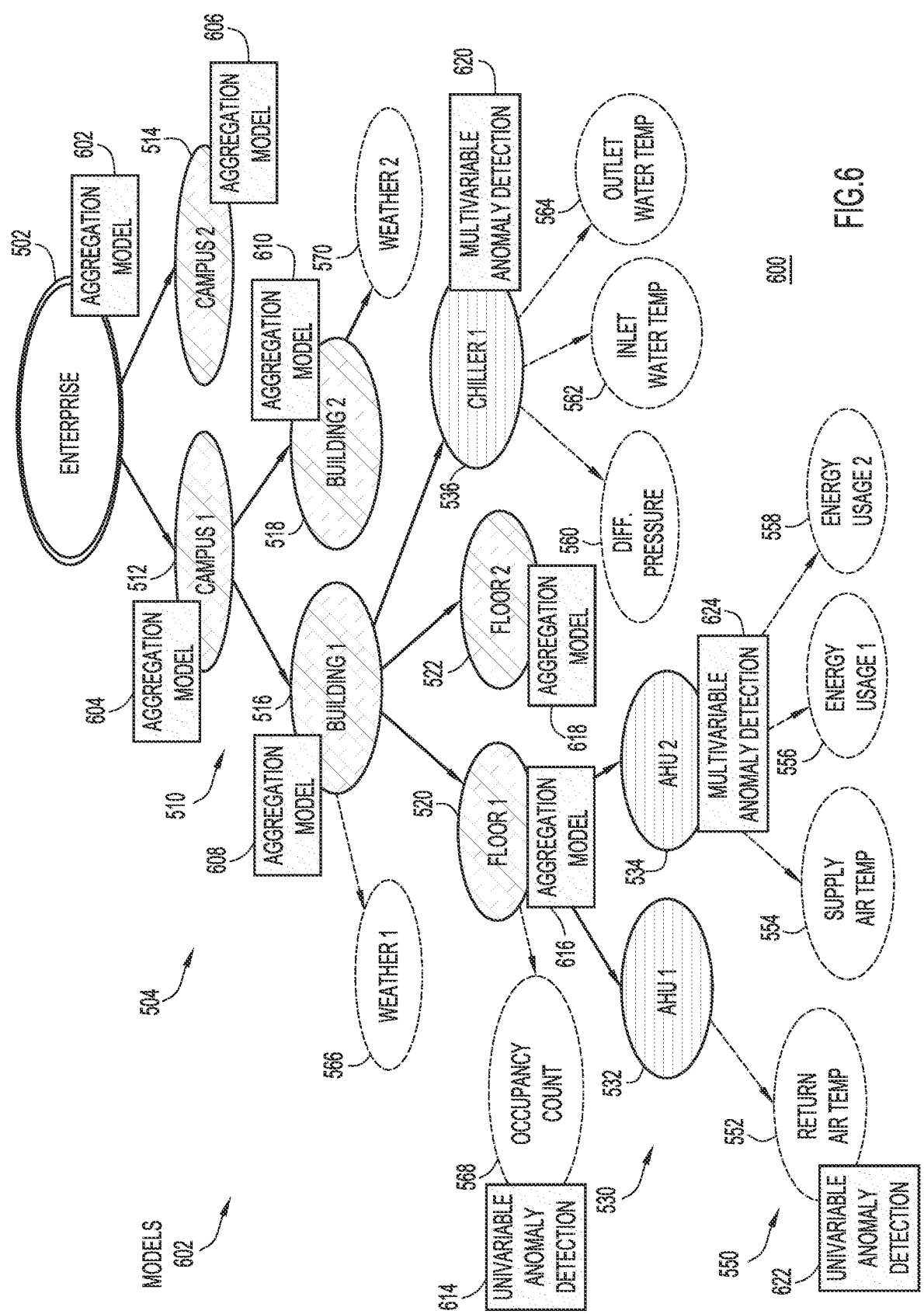
FIG. 6 is an illustrative representation of the example of the knowledge graph of FIG. 5, further illustrating a plurality of anomaly detection or prediction models that have been auto-created with use of the methods described herein.

FIG. 6 is an illustrative representation of the example of a knowledge graph 600 which is the knowledge graph of FIG. 5, but further illustrates a plurality of models 602 that have been auto-created and instantiated with use of the methods described herein. In FIG. 6, an unsupervised univariable anomaly detection model 614 has been auto-created for node descriptor 568 for the time-series data feed for the OCCUPANCY COUNT (a leaf node type and only-child node). In addition, an unsupervised univariable anomaly detection model 622 has been auto-created for node descriptor 552 for the time-series data feed for the RETURN AIR TEMP (also a leaf node type and only-child node).

Further, an unsupervised multivariable anomaly detection model 620 has been auto-created for node descriptor 536 for the asset which is the CHILLER 1 (a non-leaf node type having child nodes that are all sensor feed nodes). Also, an unsupervised multivariable anomaly detection model 624 has been auto-created for node descriptor 534 for the asset which is the AHU 2 (a non-leaf node type having child nodes that are all sensor feed nodes).

In addition, a plurality of aggregation models have been auto-created for various node descriptors in knowledge graph 600 of FIG. 6. An aggregation model 602 has been auto-created for enterprise 502; an aggregation model 604 has been auto-created for node descriptor 512 for the location which is CAMPUS 1; an aggregation model 606 has been auto-created for node descriptor 514 for the location which is CAMPUS 2; an aggregation model 608 has been auto-created for node descriptor 516 for the location which is BUILDING 1; an aggregation model 610 has been auto-created for node descriptor 518 for the location which is BUILDING 2; an aggregation model 616 has been auto-created for node descriptor 520 for the location which is FLOOR 1; and an aggregation model 618 has been auto-created for node descriptor 522 for the location which is FLOOR 2.

One or more advantages may be gained with use of the techniques and mechanisms of the present disclosure. In at least some embodiments, the initial provisioning, configuration or set-up of anomaly detection or prediction models for monitoring locations, assets, and/or sensor data feeds of an enterprise may be made more efficient and with less reliance on particular and varied skill sets of individuals. In at least some embodiments, the techniques and mechanisms of the present disclosure may leverage use of existing, reliable resources (i.e. knowledge graph, IoT data lake) to achieve such efficiencies. In at least some embodiments, anomaly detection or prediction is made more reliable, predictable, and efficient with use of reliable and consistent rules for their auto-creation, for providing an improved conservation of processing resources and operational stability of the assets. In at least some embodiments, management and maintenance of assets distributed throughout the enterprise may better realized, as development and maintenance tasks may be reduced as a result of such efficiencies. In at least some embodiments, regular on-going (e.g. day-to-day, month-to-month) auto-creation of models, as well as their auto-modification and auto-deletion, according to knowledge graph updates (e.g. newly-added/removed assets or sensors) for expedient monitoring and detection in the system also provides for improved conservation of resources and operational stability of the assets. In at least some embodiments, selection and use of a minimal or reduced set of feature variables for the model based on identifying data correlations on time-series sensor data enables efficiencies in sensor data communication and computer processing.

Figure 7:
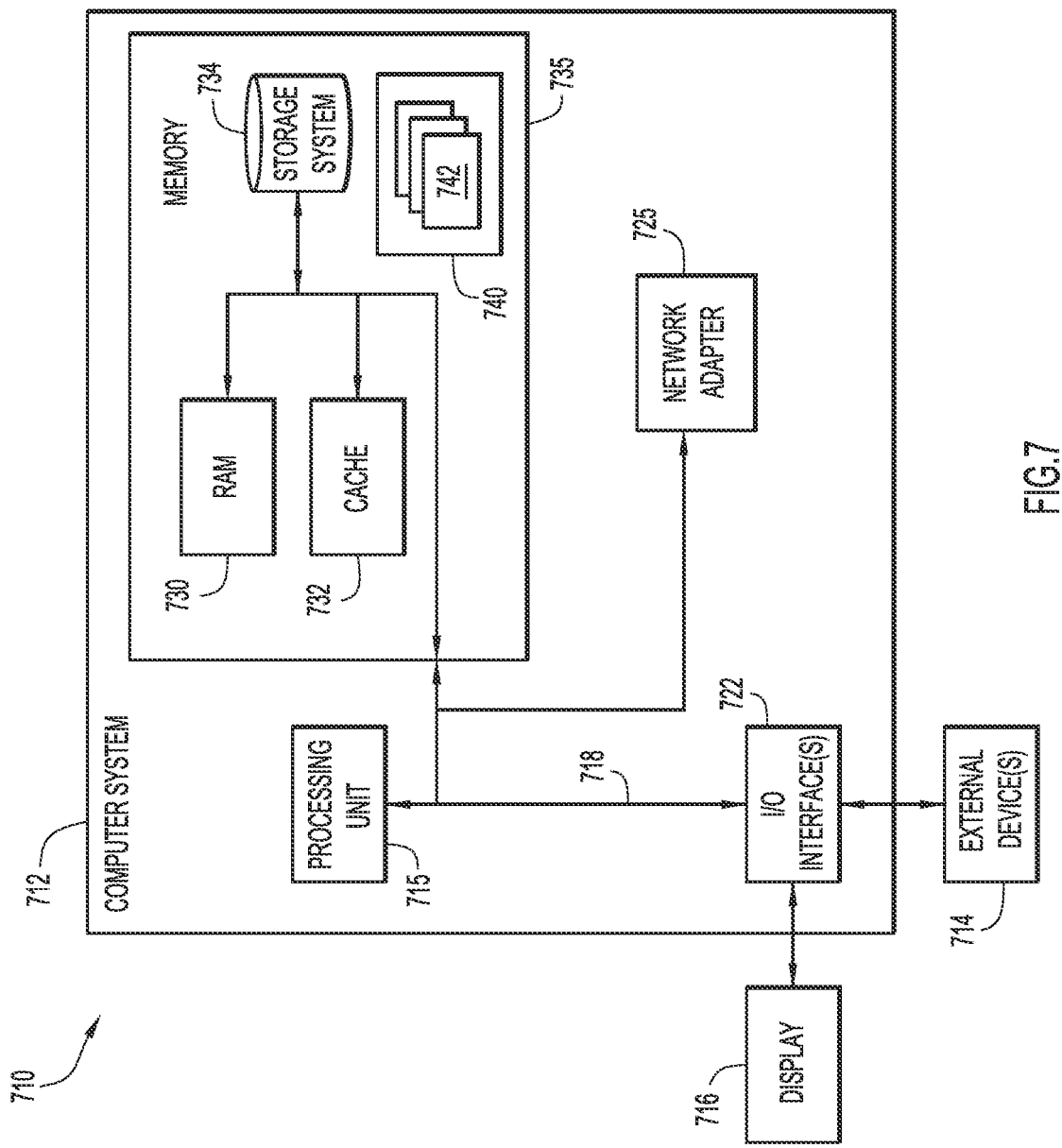
FIG. 7 is schematic block diagram of an example of a computing device which may be configured with an auto-creation module for auto-creating anomaly detection or prediction models based on a knowledge graph of an enterprise according to some embodiments.

Referring now to FIG. 7, a schematic diagram of an example of a computing device 710 which may operate in a computing environment is shown. Computing device 710 is only one example of a suitable computing device which may be utilized the relevant computing environment, and is not intended to suggest any limitation as to the scope of use or functionality of embodiments of the invention described herein. Regardless, computing device 710 is capable of being implemented and/or performing any of the functionality set forth herein.

In computing device 710, there is a computer system 712 which is operational with numerous other general purpose or special purpose computing system environments or configurations. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 7, computer system 712 is shown in the form of a general-purpose computing device. The components of computer system 712 may include, but are not limited to, one or more processors or processing units 715, a system memory 735, and a bus 718 that couples various system components including system memory 735 to processing units 715.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 712 typically includes a variety of computer system readable media. Such media may be any available media that is accessible by computer system 712, and it includes both volatile and non-volatile media, removable and non-removable media.

System memory 735 can include computer system readable media in the form of volatile memory, such as random access memory (RAM) 730 and/or cache memory 732. Computer system 712 may further include other removable/non-removable, volatile/non-volatile computer system storage media. By way of example only, storage system 734 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 735 may include at least one program product having a set (e.g., at least one) of program modules that are configured to carry out the functions of embodiments of the invention.

Program/utility 740, having a set (at least one) of program modules 742 (e.g., an auto-creation module for auto-creating anomaly detection or prediction models, or submodules thereof, and an asset monitoring tool or software, etc.) may be stored in memory 735 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system 712 may also communicate with one or more external devices 714 such as a keyboard, a pointing device, a display 716, etc.; one or more devices that enable a user to interact with computer system 712; and/or any devices (e.g., network card, modem, etc.) that enable computer system 712 to communicate with one or more other computing devices. Such communication can occur via Input/Output (I/O) interfaces 722. Still yet, computer system 712 can communicate with one or more networks such as a local area network (LAN), a general wide area network (WAN), and/or a public network (e.g., the Internet) via network adapter 725. As depicted, network adapter 725 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

It will be appreciated that the embodiments described above and illustrated in the drawings represent only a few of the many ways of implementing embodiments for the auto-creation of anomaly detection or prediction models based on a knowledge graph of an enterprise.

The environment of the present invention embodiments may include any number of computer or other processing systems (e.g., client or end-user systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., an asset monitoring tool or software, etc.). These systems may include any types of monitors and input devices (e.g., keyboard, mouse, voice recognition, etc.) to enter and/or view information.

It is to be understood that the software of the present invention embodiments (e.g., the auto-creation module for auto-creating anomaly detection or prediction models, or submodules thereof, and the asset monitoring tool or software, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., the auto-creation module for auto-creating anomaly detection or prediction models, or submodules thereof, and the asset monitoring tool or software, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data from knowledge graph, semantic data, model types data, node types data, etc.). The database system may be implemented by any number of any conventional or other databases, data stores or storage structures (e.g., files, databases, data structures, data or other repositories, etc.) to store information (e.g., data from knowledge graph, semantic data, model types data, node types data, etc.). The database system may be included within or coupled to the server and/or client systems. The database systems and/or storage structures may be remote from or local to the computer or other processing systems, and may store any desired data (e.g., data from knowledge graph, semantic data, model types data, node types data, etc.).

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be varied according to requirements and/or tools utilized as one ordinarily skilled in the art would readily appreciate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for use in a computer system having one or more processors configured to execute computer readable program instructions from a system memory, the method comprising:
 obtaining data from a knowledge graph associated with an enterprise, the knowledge graph including a plurality of node descriptors that indicate locations, assets, and sensor data feeds of the enterprise, and a plurality of relationship descriptors that indicate relationships amongst the locations, the assets, and the sensor data feeds of the enterprise;
 auto-creating an anomaly detection model associated with a selected one of the plurality of node descriptors based on the data from the knowledge graph, which includes selecting one of a plurality of model types for auto-creation of the anomaly detection model based on an identified node type of the selected node descriptor, wherein selecting one of the plurality of model types for auto-creation includes:
  selecting an unsupervised univariable anomaly detection model type as the selected model type based on identifying the identified node type as a leaf node type; and
  selecting an unsupervised multivariable anomaly detection model type as the selected model type based on identifying the identified node type as a non-leaf node type;
 monitoring, by the anomaly detection model, a location, asset, or sensor data feed associated with the selected node descriptor to detect an anomaly; and
 controlling a machine asset of the enterprise to regulate operating conditions associated with the location, asset, or sensor data feed having the detected anomaly.

2. The method of claim 1, further comprising:
 repeating the auto-creating for each one of the plurality of node descriptors in the knowledge graph, for thereby producing a plurality of anomaly detection models respectively associated with the plurality of node descriptors that represent the locations, the assets, and the sensor data feeds of the enterprise.

3. The method of claim 2, further comprising:
 deploying model instances of the plurality of anomaly detection models for anomaly detection in relation to the locations, the assets, and the sensor data feeds respectively associated with the plurality of node descriptors.

4. The method of claim 1, wherein auto-creating the anomaly detection model further comprises:
 selecting or generating one or more feature variables for the anomaly detection model based on time-series sensor data, obtained from a central repository, of one or more sensor data feeds associated with the selected node descriptor.

5. The method of claim 1, wherein selecting one of the plurality of model types for auto-creation is further based on one or more identified node types of one or more child node descriptors associated with the selected node descriptor.

6. The method of claim 1, wherein selecting the unsupervised multivariable anomaly detection model type as the selected model type based on identifying the identified node type as the non-leaf node type further comprises:
 selecting the unsupervised multivariable anomaly detection model type as the selected model type based further on identifying the selected node descriptor to have relationships with child node descriptors which are sensor feed types.

7. The method of claim 1, wherein auto-creating the anomaly detection model further comprises:
 selecting a reduced set of feature variables for the anomaly detection model of the unsupervised multivariable anomaly detection model type based on identifying data correlations on time-series sensor data of the sensor data feeds associated with the selected node descriptor.

8. The method of claim 1, further comprising:
 selecting an aggregation model type as the selected model type based on identifying the identified node type as a non-leaf node type and identifying the selected node descriptor to have a relationship with at least one child node descriptor that represents one of the locations or the assets of the enterprise.

9. The method of claim 1, wherein:
 the plurality of node descriptors that indicate the locations comprise at least one of campus locations, building locations, and floor location of the enterprise,
 the plurality of node descriptors that indicate the assets comprise machines including at least one of air handling units (AHUs) and chillers, and
 the plurality of node descriptors that indicate the sensor data feeds comprise at least one of temperature data feeds, pressure data feeds, energy usage data feeds, weather data feeds, and calendar data feeds.

10. A computer system, comprising:
 a system memory;
 one or more processors configured to execute computer readable program instructions from the system memory for:
  obtaining data from a knowledge graph associated with an enterprise, the knowledge graph including a plurality of node descriptors that indicate locations, assets, and sensor data feeds of the enterprise, and a plurality of relationship descriptors that indicate relationships amongst the locations, the assets, and the sensor data feeds of the enterprise;
  auto-creating an anomaly detection model associated with a selected one of the plurality of node descriptors based on the data from the knowledge graph, which includes selecting one of a plurality of model types for auto-creation of the anomaly detection model based on an identified node type of the selected node descriptor, wherein selecting one of the plurality of model types for auto-creation includes:
   selecting an unsupervised univariable anomaly detection model type as the selected model type based on identifying the identified node type as a leaf node type; and
   selecting an unsupervised multivariable anomaly detection model type as the selected model type based on identifying the identified node type as a non-leaf node type;
  monitoring, by the anomaly detection model, a location, asset, or sensor data feed associated with the selected node descriptor to detect an anomaly; and
  controlling a machine asset of the enterprise to regulate operating conditions associated with the location, asset, or sensor data feed having the detected anomaly.

11. The computer system of claim 10, wherein the one or more processors are configured to execute the computer readable program instructions further for:
 traversing the data in the knowledge graph to repeat the auto-creating each one of the plurality of node descriptors in the knowledge graph, for thereby producing a plurality of anomaly detection models respectively associated with the plurality of node descriptors that represent the locations, the assets, and the sensor data feeds of the enterprise; and deploying model instances of the plurality of anomaly detection models for anomaly detection in relation to the locations, the assets, and the sensor data feeds respectively associated with the plurality of node descriptors.

12. The computer system of claim 10, wherein the one or more processors are configured to execute the computer readable program instructions for auto-creating the anomaly detection model further by:

selecting or generating one or more feature variables for the anomaly detection model based on time-series sensor data, obtained from a central repository, of one or more sensor data feeds associated with the selected node descriptor.

13. The computer system of claim 10, wherein the one or more processors are configured to execute the computer readable program instructions further for auto-creating the anomaly detection model by:

selecting a reduced set of feature variables for the anomaly detection of the unsupervised multivariable anomaly detection model type based on identifying data correlations on time-series sensor data of the sensor data feeds associated with the selected node descriptor.

14. A computer program product comprising one or more computer readable storage media having computer readable program instructions collectively stored on the one or more computer readable storage media, the computer readable program instructions being executable by a computer system to cause the computer system to:

obtain data from a knowledge graph associated with an enterprise, the knowledge graph including a plurality of node descriptors that indicate locations, assets, and sensor data feeds of the enterprise, and a plurality of relationship descriptors that indicate relationships amongst the locations, the assets, and the sensor data feeds of the enterprise;

auto-create an anomaly detection model associated with a selected one of the plurality of node descriptors based on the data from the knowledge graph, which includes selecting one of a plurality of model types for auto-creation of the anomaly detection model based on an identified node type of the selected node descriptor, wherein selecting one of the plurality of model types for auto-creation includes:

selecting an unsupervised univariable anomaly detection model type as the selected model type based on identifying the identified node type as a leaf node type; and selecting an unsupervised multivariable anomaly detection model type as the selected model type based on identifying the identified node type as a non-leaf node type;

monitor, by the anomaly detection model, a location, asset, or sensor data feed associated with the selected node descriptor to detect an anomaly; and control a machine asset of the enterprise to regulate operating conditions associated with the location, asset, or sensor data feed having the detected anomaly.

15. The computer program product of claim 14, wherein the computer readable program instructions are executable by the computer system to further cause the computer system to:

traverse the data in the knowledge graph to repeat the auto-creating for each one of the plurality of node descriptors in the knowledge graph, for thereby producing a plurality of anomaly detection models respectively associated with the plurality of node descriptors that represent the locations, the assets, and the sensor data feeds of the enterprise; and deploy instances of the plurality of anomaly detection models for anomaly detection or prediction.

16. The computer program product of claim 14, wherein the computer readable program instructions are executable by the computer system to further cause the computer system to auto-create the anomaly detection model further by selecting a reduced set of feature variables for the anomaly detection model of the unsupervised multivariable anomaly detection model type based on identifying data correlations on time-series sensor data of the sensor data feeds associated with the selected node descriptor.

* * * * *